United States Patent

[11] 3,536,090

[72] Inventor John Scott, Jr.
Huntingdon Valley, Pennsylvania
[21] Appl. No. 728,011
[22] Filed May 9, 1968
[45] Patented Oct. 27, 1970
[73] Assignee Yarway Corporation
Blue Bell, Pennsylvania
a corporation of Pennsylvania

[54] THERMODYNAMIC STEAM TRAP
6 Claims, 5 Drawing Figs.
[52] U.S. Cl. ........................................ 137/183
[51] Int. Cl. ........................................ F16t 1/16
[50] Field of Search........................... 137/183, 200, 201

[56] References Cited
UNITED STATES PATENTS
3,347,257 10/1967 Gleason ............... 137/183

Primary Examiner—Alan Cohan
Attorney—Howson and Howson

ABSTRACT: A thermodynamic steam trap having a control chamber, an inlet passageway having an inlet port opening upwardly into the control chamber, and an outlet passageway leading from a channel around the inlet port in the chamber is provided with a control disc mounted in the control chamber and operable in response to flash-fluid in the chamber to block fluid flow through the outlet passageway. Baffle means mounted in the channel encircles the inlet port and increases the performance of the trap.

Patented Oct. 27, 1970
3,536,090
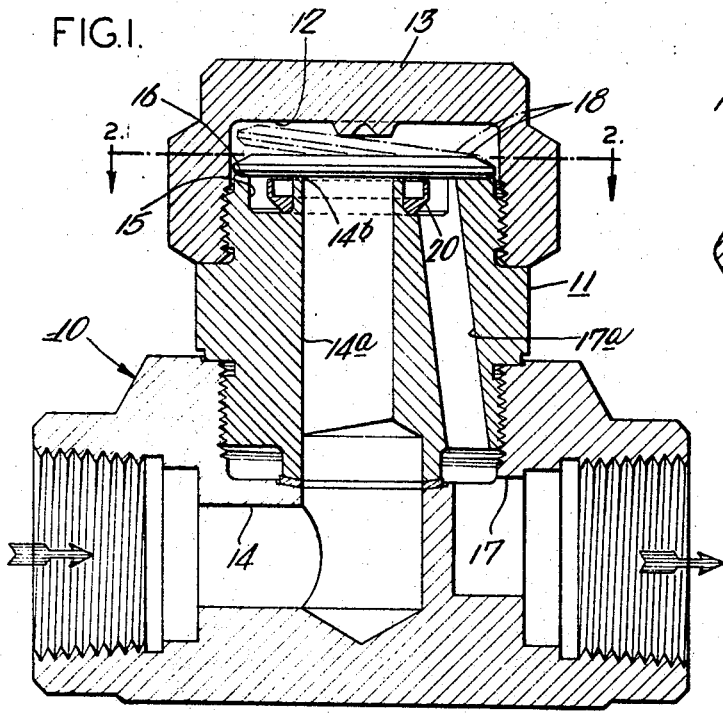
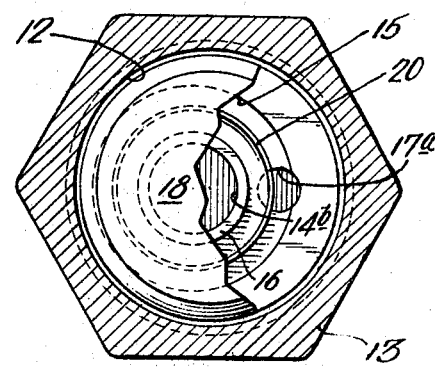
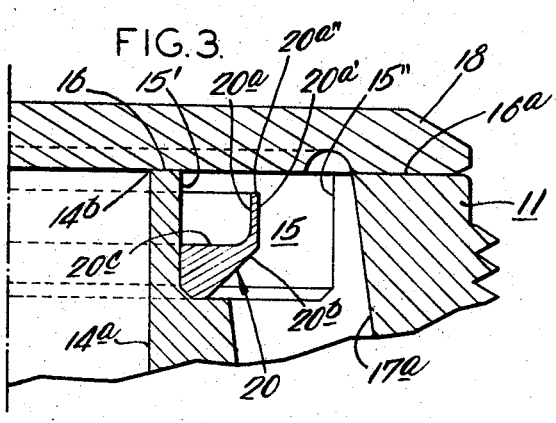
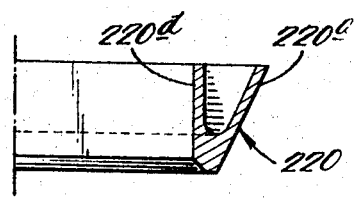
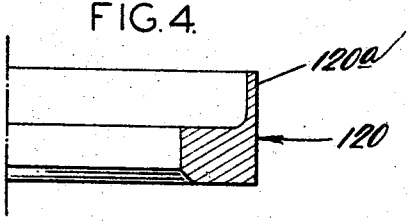
INVENTOR:
JOHN SCOTT, JR.
BY Howson & Howson
ATTYS

THERMODYNAMIC STEAM TRAP

The present invention relates to steam traps and more particularly, the present invention relates to thermodynamic steam traps of the disc-type having a control disc mounted therein for regulating the flow of fluid therethrough.

Thermodynamic steam traps are conventionally constructed with a control chamber, an inlet passageway having a port opening upwardly into the control chamber, an outlet passageway leading from an upwardly-opening, annular channel around the port and a control disc mounted for frequent displacement in the control chamber and extending across the inlet port and the channel. In operation, the control disc is displaced upwardly or away from the inlet port when condensed steam or air flows across its lower surface from the port and into the channel, and the control disc is displaced downwardly or toward the inlet port into the seating engagement with the port and the channel when hot condensate flowing out of the port is flashed into steam in the control chamber and acts upon the upper surface of the control disc. Condensation of the flash-steam within the control chamber permits the control disc to be displaced upwardly after a predetermined time interval has elapsed to again permit condensate to flow out of the outlet passageway, whereupon the cycle repeats.

Heretofore the capacity of steam traps of this type has been fixed by initial design parameters which are determined for a given set of service conditions and which are built into the trap. If the maximum capacity of a steam trap which has been installed in a system should prove inadequate for any reason, it has been necessary to remove the steam trap and replace it with another trap having increased capacity. This procedure requires that the system be shut down, often for a considerable period of time, before the necessary replacement may be made. In situations where the overall dimensions of the trap are critical, for instance where the trap must be installed in a confined space, the substitution of a larger trap is not always possible. Furthermore, from an economical manufacturing standpoint, it is desirable to produce a steam trap of high capacity having the smallest possible overall dimensions. In this manner, the weight of the trap is reduced and the costs of material are decreased accordingly.

In practice, it has been found that conventional thermodynamic traps as described heretofore are sensitive to variations in back pressure which are induced in the outlet passageway of the traps during normal operation. This back pressure tends to prevent the control disc from properly seating against the flow of steam and thereby raises the minimum operating pressure in the inlet passageway which is required to cause proper operation. Tests conducted on conventional steam traps indicate that the maximum permissible back pressure decreases as the inlet pressure increases. This means that when the steam trap is installed in a system, the frequency of operation of the steam trap at the higher inlet pressures is greater for a given amount of condensate than is required to discharge that same quantity of condensate at lower steam inlet pressures. Accordingly, the service life of the steam trap is reduced because of the wear induced therein by the increased frequency of operation at these higher pressures.

With the foregoing in mind, it is a primary object of the present invention to provide an improved thermodynamic steam trap which has a greatly increased capacity with respect to conventional thermodynamic steam traps having similar overall dimensions and proportions.

It is another object of the present invention to provide a novel thermodynamic steam trap which operates to positively block the flow of steam therethrough irrespective of increased back pressure induced in the outlet passageway when the steam trap is operating at elevated inlet pressures.

It is another object of the present invention to provide a unique thermodynamic steam trap which is economical to manufacture and which resists wear.

As a still further object, the present invention provides a novel baffle means for use in thermodynamic steam traps to permit the capacity of existing traps to be increased.

More particularly, the present invention provides baffle means for use in a thermodynamic steam trap having a control chamber into which an inlet passageway extends and terminates in a port. A channel is provided around the port and opens upwardly into the control chamber, and the channel is in fluid communication with an outlet passageway in the trap. A control disc is mounted in the control chamber for oscillation between a lower limit position which blocks fluid communication from the control chamber and the inlet passageway to the outlet passageway and a tilted upper limit position which affords fluid communication from the control chamber and inlet passageway to the outlet passageway in response to the respective presence and absence of flash-steam in the control chamber. Baffle means having an upstanding peripheral flange is mounted in the channel adjacent to the inlet port and encircles the port to cooperate with the control disc to divert fluid into the channel to increase the rate of fluid flow through the steam trap.

In addition to the foregoing objects, other objects, features and advantages of the present invention will become apparent from the following description taken in conjunction with the accompanying drawings in which:

FIG. 1 is a longitudinal sectional view of a thermodynamic steam trap embodying the present invention;

FIG. 2 is a sectional view of the steam trap of FIG. 1 taken along line 2–2, thereof;

FIG. 3 is an enlarged fragmentary view of the steam trap of FIG. 1 illustrating the preferred form of baffle means of the present invention; and FIGS. 4 and 5 are enlarged fragmentary views in cross section of modified forms of baffle means employed in the present invention.

Referring now to the drawings, FIG. 1 illustrates a thermodynamic steam trap having a body 10 which threadedly mounts an upstanding tubular seating element 11 in the upper portion thereof. In the present instance, the seating element 11 threadedly receives a bonnet or cap 13 which, in addition to defining a control chamber 12, permits convenient access to the interior of the control chamber 12 for cleaning purposes and for the replacement of parts which are mounted in the chamber. An inlet passageway 14 has an upwardly extending lateral portion 14a which projects into the control chamber 12 and which terminates in a port 14b. An upwardly-opening exhaust channel 15 (FIGS. 1,3) having an inner peripheral wall 15' and an outer peripheral wall 15" is provided around the port 14b to form annular seats 16 and 16a concentric with the port 14b. An outlet passageway 17 has a lateral portion 17a which opens upwardly into the channel 15 to provide fluid communication through the steam trap.

In order to regulate the flow of condensate and air through the trap 10, a control member or disc 18 is mounted within the chamber 12 for oscillation between a lower limit position shown in full lines in FIGS. 1 and 3, and a tilted upper limit position shown in broken lines in FIG. 1. The control disc 18 arrests the flow of steam through the outlet 17 when in its lower limit position and permits condensate and air to flow outwardly through the outlet 17 when in its upper limit position, according to well-known thermodynamic principles familiar to those skilled in the art. In accordance with these principles, the control disc 18 is elevated and tilted within the chamber 12 by the flow of air and condensate from the port 14b and into the exhaust channel 15. The control disc 18 remains in its tilted position so long as the fluid flowing outwardly from the port 14b is relatively cool; however, as the temperature of the fluid increases, the fluid flashes into vapor as it flows across the seat 16, the vapor flowing into the chamber 12 above the disc 18 producing a pressure in the chamber 12 which displaces the disc 18 downwardly into seating engagement with the seats 16 and 16a. When the control disc is in this seating position, the flow of vapor through the trap is arrested, and when the pressure within the control chamber 12 is reduced due to the condensation of vapor in the control chamber, the control disc 18 again tilts in the chamber to permit fluid to flow outwardly from the port 14b. The frequency with which the control disc 18 is displaced between its upper and lower limit positions is determined by a number of design parameters such as: the volume of the control chamber 12, the size of the port 14b, the dimensions of the exhaust channel 15, the size and location of the outlet 17, and the size and the mass of the disc 18. By varying these and other parameters, the frequency of operation of the control disc 18 may be controlled.

According to conventionally accepted theories of fluid flow, obstructions placed within the flow path of a moving fluid tend to reduce the rate of flow for a given pressure. Experiments have indicated, however, that contrary to the conventionally accepted theories, restrictions placed in the path of fluid flow in the channel surrounding the inlet port in a thermodynamic steam trap have had the beneficial effect of greatly increasing the rate of fluid flow through the trap. Therefore, in accordance with the primary object of the present invention, baffle means is provided in the channel around the inlet port of a thermodynamic steam trap to increase the capacity thereof. To this end, baffle means 20 is mounted in the exhaust channel 15 in engagement with the inner peripheral wall 15' of the channel 15. In the present instance, the baffle means 20 is annularly-shaped and has an upstanding flange or lip 20a extending around its entire outer periphery. In the preferred embodiment of the present invention, the baffle means 20 has a downwardly and inwardly tapered surface portion 20b and a shouldered surface 20c which is disposed between the flange 20a and the inner peripheral wall 15' of the channel 15.

To effect the optimum increase in the capacity of the steam trap 10, it is desirable for the outer peripheral surface 20a' of the baffle means to terminate inwardly of a cylindrical vertical plane located equidistant between the inner and outer peripheral walls of the channel 15. In addition, the capacity is optimized when the upper annular surface 20a'' of the baffle means terminates downwardly of a horizontal plane which is normal to the inlet passageway 14a, the plane intersecting the passageway 14a a predetermined distance downwardly from the port 14b. Experiments have indicated that this distance is critical, the best results being achieved when this distance is not less than 15 percent nor more than 25 percent of the depth of the channel 15 measured downwardly from the seat 16; however, other dimensions yield good trap performances. Furthermore, good results are achieved when the shouldered surface 20c terminates in a lower horizontal plane located downwardly from the seat 16 a distance of about one-third the depth of the channel 15. Also, of additional importance to the present invention is the tapered surface 20b formed on the baffle means 20. It has been found that optimum flow rates are achieved when the surface 20b is tapered inwardly toward the inner peripheral wall 15' of the channel at an angle of between 25° and 45° with respect thereto.

The baffle means may be made from any material; however, a corrosion-resistant material such as stainless steel is preferred. In addition, it is preferable for the baffle means to be securely fastened within the channel 15 to avoid undesirable oscillations which tend to wear the baffle element and which also tend to reduce its effectiveness. Furthermore, the present invention possesses an additional advantage since the capacity of an existing steam trap may be quickly increased merely by removing the bonnet 13 and control member 18 and securing the baffle element in the channel. Therefore, a variety of baffle means each having different dimensions permits the capacity of an existing steam trap to be quickly increased to correspond with increased system requirements.

Referring now to FIG. 4, modified baffle means 120 is illustrated having an upstanding peripheral flange or lip 120a. This modified form of baffle means is similar in shape to the baffle means 20 (FIG. 3) except for the inwardly tapered peripheral surface 20b which is provided on the preferred baffle means.

Illustrated in FIG. 5 is another form of baffle means 220 which is frusto-conically shaped having an upwardly and outwardly tapering flange 220a. An upright sleeve 220d adapted to engage the inner peripheral wall of the channel in a thermodynamic steam trap cooperates with the flange 220a to define a V-shaped annular groove inwardly of the flange 220a.

In light of the foregoing description, it may be seen that each baffle means described heretofore cooperates with the annular channel around the inlet port in the steam trap to define an upwardly opening annular groove therearound. Although the function of the annular groove cannot be completely explained, tests conducted on a steam trap made from transparent material indicate that the control disc elevates or opens to a higher limit position when the grooved baffle means is present than would be the case if the grooved baffle means were not present. One possible explanation which has been advanced for this phenomenon is that the peripheral flange on the baffle means reduces the pressure drop across the seat around the inlet port and conserves static pressure, so that the static pressure acts upon a greater surface area of the control disc to thereby elevate the control disc a greater distance and permit an increased quantity of fluid to flow outwardly from the port into the channel. In this manner, the capacity of the steam trap is increased by the presence of baffle means mounted within the channel adjacent to the inlet port.

In order to more fully appreciate the advance in the art which has been made by the present invention, tests have been conducted on a conventional disc-type steam trap both with and without baffle means mounted within its channel. The tests were conducted with cold and hot water, the inlet pressure during the cold water tests being maintained at 40 pounds per square inch gauge (psig) and the inlet pressure for the hot water tests being maintained at 100 psig. Three traps were tested (first without baffle means, and then with baffle means having the configuration of the preferred embodiment). The results of these tests are indicated below in table 1.

TABLE I

| Trap | Average capacity, lb./hr. | | | | | | Back pressure (percent of inlet pressure at 100 p.s.i. inlet) | | Minimum operating pressure, p.s.i.g. | |
| | Cold water | | | Hot water | | | | | | |
| | W/O[1] | W/[2] | Percent increase | W/O[1] | W/[2] | Percent increase | W/O[1] | W/[2] | W/O[1] | W/[2] |
|---|---|---|---|---|---|---|---|---|---|---|
| I | 1,500 | 2,435 | 162 | 1,615 | 2,507 | 167 | 57.4 | 81.1 | 1½-2 | 1½ |
| II | 1,700 | 2,465 | 145 | 1,766 | 2,651 | 150 | 60.1 | 85.4 | 1½-2 | 1½ |
| III | 1,565 | 2,420 | 154 | 1,781 | 2,536 | 142 | 60.5 | 82.1 | 1½-2 | 1½ |

[1] W/O = Without baffle means.
[2] W/ = With baffle means.

As may be seen from table 1, the capacity of the steam trap with baffle means mounted therein is increased by about 150 percent. Furthermore, the presence of baffle means raised the maximum permissible operating back pressure to a value in excess of 80 percent of the inlet pressure. In traps without a baffle, the trap operates satisfactorily at 80 percent back pressure only with low inlet pressures, and when the inlet pressure is increased to 100 psi, the back pressure must be less than about 60 percent for effective operation. The minimum pressure required to operate the steam trap was also reduced as may be seen in the table. Thus, a marked increase in the performance of a disc-type steam trap is effected by baffle means mounted in the channel adjacent the inlet port.

As noted heretofore, experiments conducted with various shapes of baffle means have indicated that certain dimensions of the baffle means are critical if an optimum increase in capacity is to be achieved. Of possibly the greatest significance is the height and location of the peripheral flange with respect to the walls of the channel. In order to demonstrate this criticality, a steam trap having a channel formed around the inlet port with a channel depth of .220 inches measured downwardly from the seat around the port and a channel width of .253 inches was tested with baffle means having the configurations shown in FIGS. 3, 4 and 5 and wherein only the height of the peripheral flange was varied, the baffle means extending into the channel from the inner peripheral wall thereof to substantially the middle of the channel. The tests were conducted with both hot and cold water at the same pressures employed in the tests performed in table I. The results of these tests are listed in tabular form in the following table (table II). The dimensions listed across the top of table II are measured downwardly from the seat around the port, the peripheral flanges being progressively shorter toward the right-hand side of the table and the clearance between the flanges and the control disc being progressively greater.

and changes may be made thereto without departing from the spirit and scope of the present invention as defined in the appended claims.

I claim:

1. In a thermodynamic steam trap having a body, a control chamber formed in the body, an inlet passageway extending into the chamber and terminating in an upwardly-opening port, an upwardly-opening exhaust channel in said body having inner and outer peripheral walls and a bottom wall with the inner peripheral wall extending around said port, an outlet passageway in fluid communication with the exhaust channel and terminating at the bottom wall of the exhaust channel, and a control member mounted in the chamber for displacement between a lower limit position blocking fluid communication between the inlet passageway and the outlet passageway in response to the presence of flashed fluid in the chamber and an upper limit position affording fluid communication between the inlet passageway and the outlet passageway in response to the absence of flashed fluid in the chamber, the improvement comprising annular baffle means mounted in the channel and encircling said port adjacent the inner peripheral wall of the channel, said baffle means having an annular radially projecting base portion engaging the inner peripheral wall and bottom wall of said exhaust channel and an upright flange portion projecting upwardly from the edge of said base portion remote from said peripheral wall within said exhaust channel between and spaced from the inner and outer peripheral walls of said exhaust channel, said flange portion terminating a predetermined distance downwardly from said port, said baffle means providing within said exhaust channel and upwardly opening annular recess of substantially lesser depth than the depth of said exhaust channel and a width less than approximately one-half of the width of said exhaust channel, whereby fluid flows from the port over the baffle means

TABLE II.—CAPACITY LB./HR.

| Configuration of baffle means | Without baffle means | | With baffle means | | | | | | | | | |
|---|---|---|---|---|---|---|---|---|---|---|---|---|
| | | | .033" (15%) | | .043" | | .053" (25%) | | .063" | | .073" (33⅓%) | |
| | Cold | Hot | Cold | Hot | Cold | Hot | Cold | Hot | Cold | Hot | Cold | Hot |
| Fig. 3 | 1,900 | 2,137 | 2,975 | 3,120 | 3,257 | 3,334 | 2,355 | | 2,458 | | 2,425 | |
| Fig. 4 | 1,900 | 2,137 | 1,545 | | 2,580 | | | | | | | |
| Fig. 5 | 1,900 | 2,137 | 3,242 | 2,950 | 3,046 | 1,901 | 2,163 | | 2,133 | | 2,225 | |

Thus, from table II it may be seen that the greater changes in capacity of the steam trap occur when the upper edge of the peripheral flange is between .033 inches and .053 inches from the seat, representing 15 percent and 25 percent of the depth of the channel respectively. That is, the cold water capacity increases from 1900 0/hr., to 3334 0/hr., at 20 percent of the channel depth. Moreover, the importance of the inwardly tapered surface on the preferred baffle means of FIG. 3 may also be observed from table II. For example, with the same overall dimensions for the baffle means of FIGS. 3 and 4, the distance between the flange and the port being .043 inches, the presence of the tapered surface increases the capacity of the steam trap from 2580 pounds per hour to 3257 pounds per hour of cold water.

In view of the foregoing description, it is apparent that baffle means has now been provided to quickly increase the capacity of existing disc-type steam traps. Moreover, the baffle means of the present invention also permits the construction of compact steam traps which are economical to manufacture, resistant to wear, and dependable in performance.

Although reference has been made throughout the foregoing description to the upright position of the steam trap; nevertheless, this position is exemplary only and is not to be construed as a limitation since the steam trap operates effectively in any position, even inverted.

While preferred embodiments of the present invention have been described in detail, various modifications, alterations and outwardly into the channel when the control member is in its upper limit position to increase the performance of the steam trap.

2. Apparatus according to claim 1 wherein said predetermined distance is not less than 15 percent nor greater than 25 percent of the depth of the channel measured downwardly from the port.

3. Apparatus in accordance with claim 1 wherein the flange portion of said baffle means lies in a vertical plane overlying the termination of the outlet passageway in the bottom wall of said exhaust channel and the surface of said flange portion and base portion of said baffle means remote from the inner peripheral wall of said exhaust channel are tapered inwardly and downwardly toward the inner peripheral wall of said exhaust channel.

4. Apparatus in accordance with claim 1 wherein said baffle means is tightly secured within said exhaust channel.

5. Apparatus in accordance with claim 1 wherein said baffle means is loosely received within said exhaust channel.

6. In a thermodynamic steam trap having a body, a control chamber formed in the body, an inlet passageway extending into the chamber and terminating in an upwardly-opening port, an upwardly-opening exhaust channel having an inner peripheral wall formed in the body around the port and an outer peripheral wall spaced from the inner peripheral wall, an outlet passageway adjacent the outer peripheral wall in fluid communication with the exhaust channel, and a control member mounted in the chamber for displacement between a lower limit position blocking fluid communication between the inlet passageway and the outlet passageway in response to the presence of flashed fluid in the chamber and an upper limit position affording fluid communication between the inlet passageway and the outlet passageway in response to the absence of flashed fluid in the chamber, the improvement comprising annular baffle means mounted in the channel and encircling said port in engagement with the inner peripheral wall of the channel, said baffle means having an upper surface spaced downwardly from the plane of said port and an outer surface spaced inwardly of the middle of the channel and tapering inwardly and downwardly toward the inner peripheral wall of said channel, said baffle means further having an annular groove formed in said upper surface inwardly of said outer surface and having a depth of less than one-third the depth of said channel measured from said port, whereby fluid flows from the port and over the baffle means into the channel when the control member is in its upper limit position to increase the performance of the steam trap.

UNITED STATES PATENT OFFICE
CERTIFICATE OF CORRECTION

Patent No. 3,536,090  Dated October 27, 1970

Inventor(s) John Scott, Jr.

It is certified that error appears in the above-identified patent and that said Letters Patent are hereby corrected as shown below:

Col. 5, line 54, change 0/hr. (both occurrences) to ---lb/hr.---

SIGNED AND
SEALED
FEB 2 1971

Febuary 23, 1971

(SEAL)
Attest:

Edward M. Fletcher, Jr.
Attesting Officer

WILLIAM E. SCHUYLER, JR.
Commissioner of Patents